United States Patent
Poupart et al.

(10) Patent No.: US 10,382,366 B2
(45) Date of Patent: Aug. 13, 2019

(54) METHOD, SYSTEM AND APPARATUS FOR AUTONOMOUS MESSAGE GENERATION

(71) Applicant: KIK INTERACTIVE INC., Waterloo (CA)

(72) Inventors: Pascal Poupart, Waterloo (CA); Pan Pan Cheng, Waterloo (CA); Jesse Hoey, Waterloo (CA)

(73) Assignee: KIK INTERACTIVE INC., Kitchener (CA)

( * ) Notice: Subject to any disclaimer, the term of this patent is extended or adjusted under 35 U.S.C. 154(b) by 195 days.

(21) Appl. No.: 15/337,464

(22) Filed: Oct. 28, 2016

(65) Prior Publication Data

US 2017/0134313 A1 May 11, 2017

Related U.S. Application Data

(60) Provisional application No. 62/253,847, filed on Nov. 11, 2015.

(51) Int. Cl.
*H04L 12/58* (2006.01)
*H04L 29/06* (2006.01)

(52) U.S. Cl.
CPC .............. *H04L 51/02* (2013.01); *H04L 51/04* (2013.01); *H04L 67/42* (2013.01)

(58) Field of Classification Search
CPC .......... H04L 51/02; H04L 51/04; H04L 67/42
USPC ....................................................... 709/206
See application file for complete search history.

(56) References Cited

U.S. PATENT DOCUMENTS

2004/0111408 A1* 6/2004 Caudill ............... G06F 17/3069
2016/0352656 A1* 12/2016 Galley .................... H04L 51/02

OTHER PUBLICATIONS

Andrew Mckirdy, Line's AI program captures hearts with lifelike personality, Aug. 6, 2015, The Japan Times, https://www.japantimes.co.jp/news/2015/08/06/business/tech/lines-ai-program-captures-hearts-lifelike-personality.*
Mannu Saund, Top 5 Ways to Customize Slack, Oct. 26, 2015, medium.com, https://medium.com/mannu-s-tech-stories/top-5-ways-to-customize-slack-aa2c6a117cbe.*

* cited by examiner

*Primary Examiner* — Zi Ye (57) ABSTRACT

A method is provided in an application server, comprising: storing a plurality of primary class definitions in a memory, each primary class definition including a primary class identifier and a plurality of primary class attributes; storing a plurality of secondary class definitions in a memory, each secondary class definition including a secondary class identifier and a plurality of secondary class attributes; receiving a message from a client computing device via a network; based on the content of the message, selecting one of the primary class identifiers, and one of the secondary class identifiers; selecting primary response data corresponding to the selected primary class identifier; selecting secondary response data corresponding to the selected secondary class identifier; generating a response message by combining the primary response data and the secondary response data; and transmitting the response message to the client computing device.

16 Claims, 5 Drawing Sheets

METHOD, SYSTEM AND APPARATUS FOR AUTONOMOUS MESSAGE GENERATION

CROSS-REFERENCE TO RELATED APPLICATION

This application claims priority from U.S. Provisional Patent Application No. 62/253,847, filed Nov. 11, 2015, the contents of which is incorporated herein by reference.

FIELD

The specification relates generally to autonomous messaging applications (e.g. chatbots), and specifically to a method, system and apparatus for autonomous message generation.

BACKGROUND

Autonomous messaging systems, also referred to as chatbots, have grown in popularity in recent years. The capabilities and programmed behaviours of different chatbots vary depending on their intended audience—chatbots intended for entertainment purposes may employ different language processing and response algorithms than those intended to respond to customer service messages or complete Turing Tests. In general, however, chatbots can be configured to recognize various characteristics of messages they receive, and to respond to those messages differently depending on which characteristics were recognized in the received messages.

One of the challenges in configuring chatbot applications involves determining which response to select for an incoming message (e.g. from a human user). For a certain set of characteristics recognized by the chatbot in the message, for example defining a topic (e.g. the weather), there may be a large set of possible responses. Certain ones of those responses may be more appropriate than others, but accurately identifying an appropriate one of a set of responses (as opposed to simply selecting one of the set of responses at random) may be either infeasible for current chatbots, or may impose a substantial computational burden.

SUMMARY

According to an aspect of the specification, a method in an application server is provided, comprising: storing a plurality of primary class definitions in a memory, each primary class definition including a primary class identifier and a plurality of primary class attributes; storing a plurality of secondary class definitions in a memory, each secondary class definition including a secondary class identifier and a plurality of secondary class attributes; receiving a message from a client computing device via a network; based on the content of the message, selecting one of the primary class identifiers, and one of the secondary class identifiers; selecting primary response data corresponding to the selected primary class identifier; selecting secondary response data corresponding to the selected secondary class identifier; generating a response message by combining the primary response data and the secondary response data; and transmitting the response message to the client computing device.

BRIEF DESCRIPTIONS OF THE DRAWINGS

Embodiments are described with reference to the following figures, in which.

DETAILED DESCRIPTION OF THE EMBODIMENTS

Figure 1:
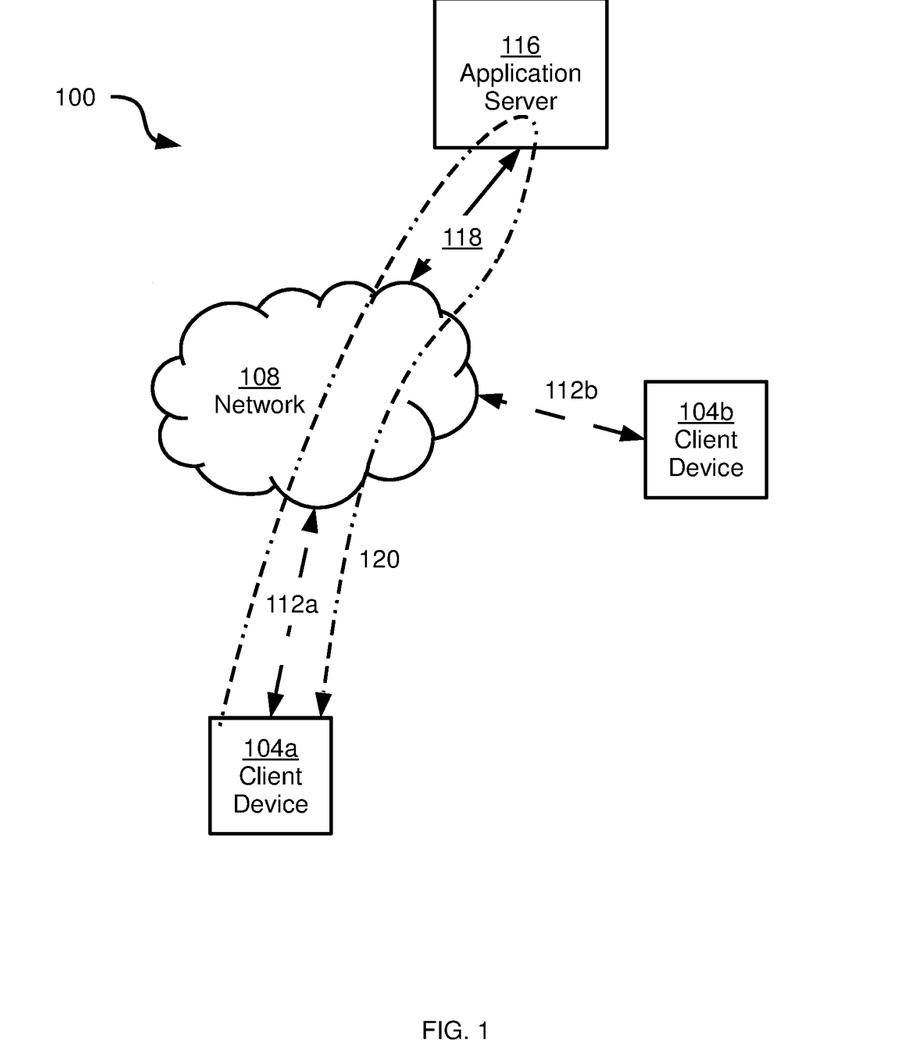
FIG. 1 depicts a communications system, according to a non-limiting embodiment.

FIG. 1 depicts a communications system 100. System 100 includes a plurality of client computing devices, of which two examples 104a and 104b are shown (referred to generically as a client computing device 104, and collectively as client computing devices 104). Additional client computing devices (not shown) can be included in system 100. Each client computing device 104 can be any of a cellular phone, a smart phone, a tablet computer, desktop computer, and the like. Client computing devices 104 are also referred to herein as client devices 104.

Client devices 104a and 104b are connected to a network 108 via respective links 112a and 112b, which are illustrated as wireless links but can also be wired links, or any suitable combination of wired and wireless links. Network 108 can include any suitable combination of wired and wireless networks, including but not limited to a Wide Area Network (WAN) such as the Internet, a Local Area Network (LAN) such as a corporate data network, cell phone networks, WiFi networks, WiMax networks and the like.

Via network 108, client devices 104 can communicate with an application server 116 connected to network 108 via a link 118. Application server 116 provides a messaging service to client devices 104. For example, client device 104a can execute a messaging application for sending and receiving messages to and from application server 116. Such messages can include instant messages (e.g. Internet Protocol-based messages), Short Message Service (SMS) messages, Multimedia Messaging Service (MMS) messages and the like. In this example, as shown by message path 120, client device 104a transmits a message to application server 116, and application server 116 generates and returns a response to client device 104a. In other words, application server 116 functions as a chatbot, autonomously carrying on a conversation with the user of client device 104a by automatically responding to messages received from client device 104a. In some embodiments, application server 116 can also route messages between client devices 104 (e.g. from client device 104a to client device 104b), however such embodiments are not discussed in detail herein.

Before a detailed discussion of the operation of system 100 is provided, certain components of client device 104a and application server 116 will be described with reference to FIG. 2.

Figure 2:
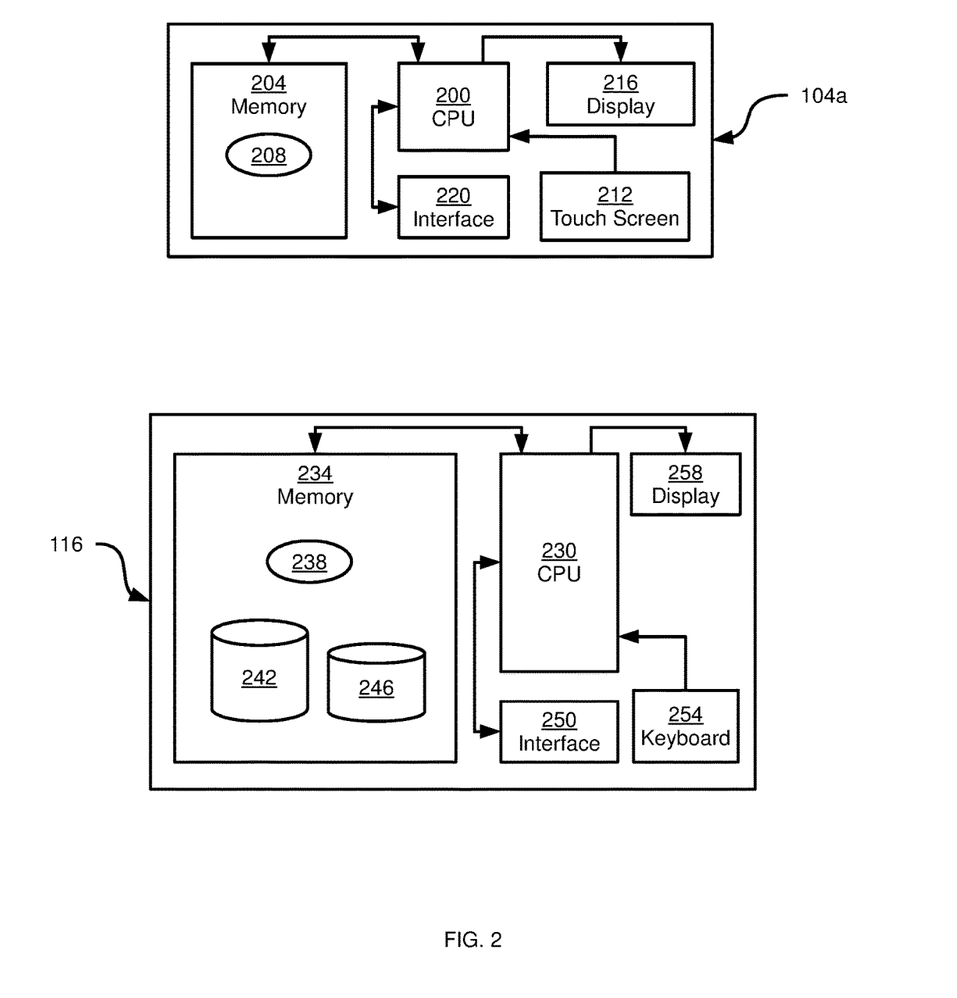
FIG. 2 depicts certain components of the application server and client device of the system of FIG. 1, according to a non-limiting embodiment.

Referring now to FIG. 2, client device 104a includes a central processing unit (CPU) 200, also referred to herein as processor 200, interconnected with a memory 204. Memory 204 stores computer readable instructions executable by processor 200, including a messaging application 208. Processor 200 and memory 204 are generally comprised of one or more integrated circuits (ICs), and can have a variety of structures, as will now occur to those skilled in the art (for example, more than one CPU can be provided). Processor 200 executes the instructions of messaging application 208 to perform, in conjunction with the other components of client device 104a, various functions related to exchanging messages with application server 116. In the below discussion of those functions, client device 104a is said to be configured to perform those functions—it will be understood that client device 104a is so configured via the processing of the instructions in application 208 by the hardware components of client device 104a (including processor 200 and memory 204).

Client device 104a also includes input devices interconnected with processor 200. In the present example, in which client device 104a is a mobile computing device, the input devices of client device 104a include a touch screen 212. Client device 104a can also include other input devices, such as any suitable combination of a camera, a microphone, a GPS receiver, and the like (not shown). Client device 104a also includes output devices interconnected with processor 200, including a display 216 integrated with touch screen 212. Other output devices can also be provided, such as a speaker (not shown). Client device 104a also includes a network interface 220 interconnected with processor 200, which allows client device 104a to connect to network 108 via link 112a. Network interface 220 thus includes the necessary hardware, such as radio transmitter/receiver units, network interface controllers and the like, to communicate over link 112a.

Application server 116 includes a central processing unit (CPU) 230, also referred to herein as processor 230, interconnected with a memory 234. Memory 234 stores computer readable instructions executable by processor 230, including an autonomous messaging application 238. Processor 230 and memory 234 are generally comprised of one or more integrated circuits (ICs), and can have a variety of structures, as will now occur to those skilled in the art (for example, more than one CPU can be provided). Processor 230 executes the instructions of application 238 to perform, in conjunction with the other components of application server 116, various functions related to receiving and responding to messages from client devices 104. In the discussion below of those functions, application server 116 is said to be configured to perform those functions—it will be understood that application server 116 is so configured via the processing of the instructions in application 238 by the hardware components of application server 116 (including processor 230 and memory 234).

Memory 234 also stores a message database 242, which contains messages received from client devices 104. Also stored in memory 234 is a classification database 246, which contains definitions of message classes, as well as predefined response messages for each message class. Message class definitions specify various attributes that can be matched to message characteristics. Class attributes can include keywords, keyword frequencies, and the like. Message class definitions can also include probabilities or probability distributions (e.g. the probability of a certain keyword appearing in messages of a certain class). Various other examples of attributes that define classifications will occur to those skilled in the art from the discussion of message classification below.

Classification database 246 contains two distinct sets of class definitions, specifically a set of primary class definitions and a set of secondary class definitions. In other embodiments, the secondary set of class definitions can be stored in a separate database (not shown) in memory 234. Each class definition includes one or more class attributes. As will be described below, application server 116 is configured to compare a received message to the class definitions, and to classify the received message according to the class definition whose attributes best match characteristics of the received message.

A group of messages that match a given class definition have a message aspect in common. Class definitions from the primary set and the secondary set correspond to distinct, independent aspects of the messages. In particular, in the present embodiment, primary class definitions each define one of a plurality of topics (e.g. weather, sports, vehicles, food and the like), and thus received messages having the same primary classification have a topic aspect in common. Class definitions from the secondary set, in the present embodiment, each define one of a plurality of emotional states (e.g. happy, angry, sad and the like), and thus received messages having the same secondary classification have an emotional aspect in common. In other embodiments, the primary and secondary class definitions can represent other aspects of the received messages. Of particular note, the message aspect described by the primary classes (e.g. topic) and the message aspect described by the secondary classes (e.g. emotion) are substantially independent, and each received message can exhibit both aspects.

Application server 116 also includes a network interface 250 interconnected with processor 230, which allows application server 116 to connect to network 108 via link 118. Network interface 250 thus includes the necessary hardware, such as network interface controllers and the like, to communicate over link 118. Application server 116 also includes input devices interconnected with processor 230, such as a keyboard 254, as well as output devices interconnected with processor 230, such as a display 258. Other input and output devices (e.g. a mouse, speakers) can also be connected to processor 230. In some embodiments (not shown), keyboard 254 and display 258 can be connected to processor 230 via network 108 and another computing device. In other words, keyboard 254 and display 258 can be local (as shown in FIG. 2) or remote.

As will be described in greater detail below, for each incoming message from a client device 104, application server 116 selects a primary class definition from database 246 whose attributes best match the characteristics of that message, and also selects a secondary class definition from database 246 whose attributes best match the characteristics of the message. In other words, application server 116 is configured to identify which topic aspect and which emotional aspect the message exhibits. Application server 116 then responds to the message based on the selected primary and secondary classes. To that end, application server 116 stores primary and secondary response data that can be combined to generate a response. The response data can be stored in database 246. For example, each class definition can be accompanied in database 246 by one or more items of response data. Each primary class, for instance, may have stored in association therewith one or more textual responses; meanwhile, each secondary class may have stored in association therewith one or more emoticons, images or the like. A wide variety of other response data can also be employed. For example, emotional response data can include text data instead of, or in addition to, emoticon or image data.

Tables 1 and 2 illustrate examples of primary and secondary class response data, respectively. In particular, database 246 contains records each having a class identifier, and at least one response data item such as a string of text.

TABLE 1

Example Primary Class Response Data

| Primary Class ID | Response Data |
|---|---|
| Weather | "Winter is my favourite season!" |
|  | "Rain is the worst . . ." |
| Sports | . . . |
| . . . | . . . |

TABLE 2

Example Secondary Class Response Data

| Secondary Class ID | Response Data |
|---|---|
| Happy | :) |
| Sad | :( |
| . . . | . . . |

Figure 3:
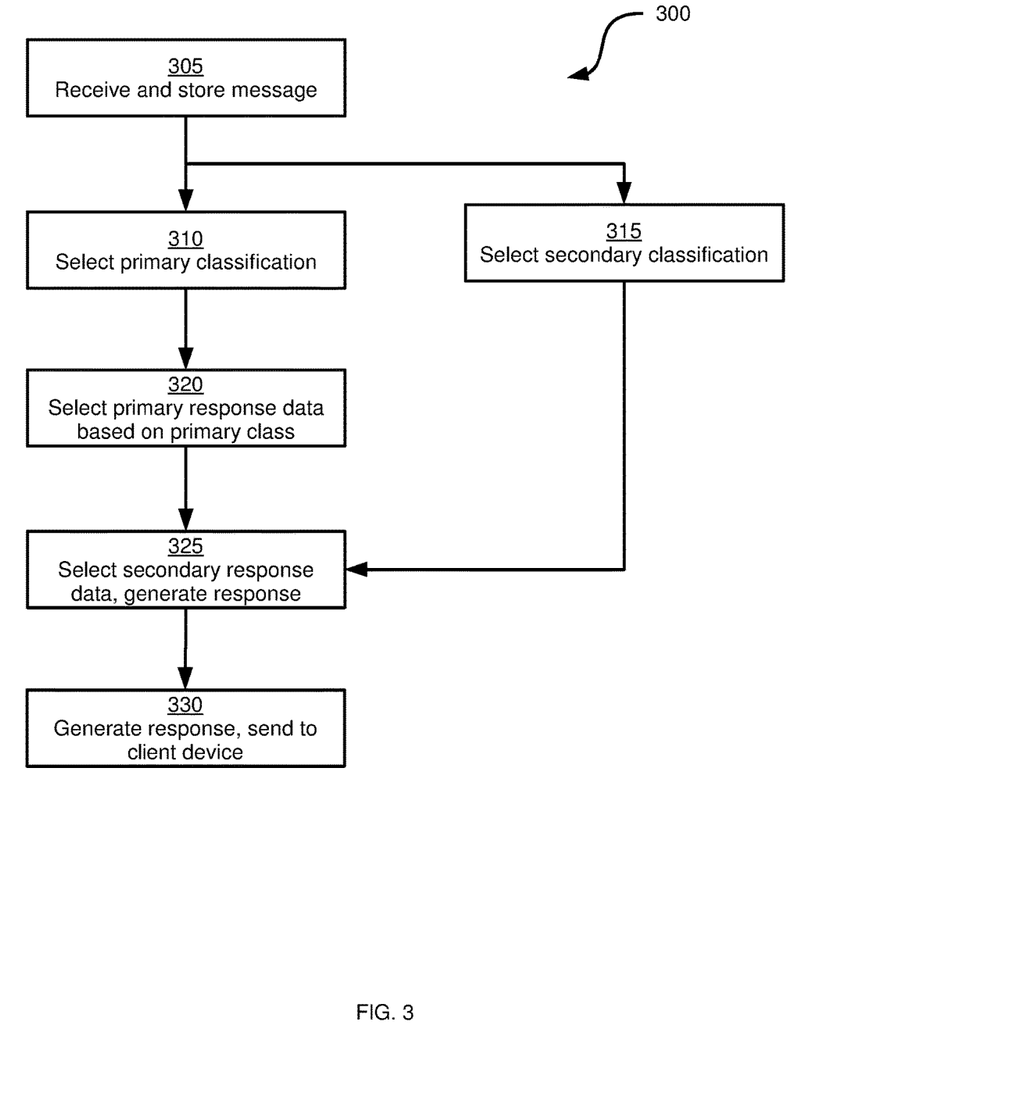
FIG. 3 depicts a method of autonomous response message generation, according to a non-limiting embodiment.

Referring now to FIG. 3, a method 300 of autonomous response message generation is shown. Method 300 will be described in connection with its performance on system 100, and specifically on application server 116, to process messages from client device 104a and generate responses to such messages automatically. It will be apparent to those skilled in the art, however, that method 300 can also be performed in variations of system 100.

Beginning at block 305, application server 116 is configured to receive a message from client device 104a, as shown in FIG. 1 (see message path 120). The received message is stored in message database 242 for further processing. Other data can be stored in database 242 in association with the received message, such as an originator identifier corresponding to client device 104a (e.g. an account identifier, a telephone number or MSISDN, and the like).

Responsive to receiving the message from client device 104a, application server 116 is configured to perform two classification actions. In the present embodiment, prior to classification, application server 116 is also configured to parse the received message into a plurality of tokens. The tokens can be words (i.e. strings separated by "space" characters or other punctuation), or sets of words (e.g. a sequence of two words). Application server 116 then normalizes the tokens to remove extraneous characters from words. For example, the token "nnnoooooo" is replaced with the normalized token "no". A set of configurable normalization rules can be stored in memory 234 defining which character removal or replacement operations are performed at this stage. The normalized tokens can also (optionally) be passed through a spell-check process. In general, the tokenization process seeks to distill characteristics from the received message that can be compared to class definitions.

At block 310, application server 116 is configured to select one of the primary class definitions from database 246 based on a comparison between the characteristics of the message received at block 305 and the attributes of the primary class definitions. Classification at block 310 may be performed in a variety of ways. In the present example, application 238 includes a classifier module which, when executed by processor 230, configures processor 230 to implement a Support Vector Machine (SVM) or any other suitable classification process (e.g. Bayesian, k-Nearest Neighbours (k-NN), and the like) to compare the received message with each of the primary class definitions stored in classification database 246.

As noted earlier, database 246 includes, for each primary class, a class identifier (e.g. a class name) and one or more class attributes defining common characteristics of messages in that class. To select a primary classification for the received message, application server 116 can be configured to determine the probability that the received message is a member of each defined primary class, based on how similar the content of the received message is to the attributes of each class defined in database 246. Application server 116 selects the class with the highest probability. An identifier of the selected class (such as the class name) may be stored in association with the message in database 242, although this is not mandatory. At block 310, therefore, application server 116 is configured to determine which of a plurality of topics is exhibited by the message received at block 305.

Either in parallel with block 310 or sequentially with (that is, before or after) block 310, application server is configured to perform block 315 of method 300. At block 315, application server 116 is configured to select one of the secondary class definitions from database 246 based on a comparison between the characteristics of the message received at block 305 and the attributes of the secondary class definitions. As noted above in connection with block 310, classification at block 315 may be performed in a variety of ways. In the present example, processor 230 is configured to implement a further Support Vector Machine (SVM), distinct from the SVM implemented to select a primary class. In other embodiments, any other suitable classification process (e.g. Bayesian, k-Nearest Neighbours (k-NN), and the like) can also be executed to compare the received message with each of the secondary class definitions stored in classification database 246. Different classification processes can also be implemented to select a secondary class than those implemented to select a primary class.

Having performed blocks 310 and 315, application server 116 has identified which topic aspect, and which emotional aspect are exhibited by the message received at block 305. For example, the primary class selected at block 310 may be "weather" and the secondary class selected at block 315 may be "happy" (e.g. indicating that the contents of the message received at block 305 indicates that the operator of client device 104a is happy about the weather).

Responsive to selecting a primary class and a secondary class for the received message, application server 116 is then configured to generate a response to the message. Specifically, at block 320, application server 116 is configured to select primary response data for the message received at block 305 based on the primary class selected at block 310. As noted earlier, database 246 contains a plurality of predefined responses in association with each primary class. Thus, at block 320, application server 116 automatically selects one of the predefined response messages that is stored in association with the class selected at block 310. Thus, if the message was classified as a weather-related message (e.g. "I love the cold"), application server 116 may select a response at block 315 from a pool of weather-related predefined responses (e.g. "Winter is my favourite season!"). In the present example, when more than one predefined response is available for a given class, application server 116 is configured to select a response at random from the pool of responses for the selected class.

At block 325, application server 116 is configured to select secondary response data based on the secondary class selected at block 315. In the present embodiment, the secondary response data is selected from database 246, which contains at least one item of secondary response data corresponding to each secondary class definition. In the present embodiment, the items of secondary response data include emoticons (including both text-based emoticons and image-based emoticons, which are also referred to as emoji), images (e.g. Graphics Interchange Format, GIF or the like) or combinations thereof. In other embodiments, a variety of other types of secondary response data can be contained in database 246.

Continuing with the example discussed above, in which the secondary classification selected at block 315 is "happy", an emoticon such as a "smiley face" (e.g. the text string ":)" or the character "☺", or an image of a smiley face) can be retrieved from database 246 at block 325. In some embodiments, as with primary response data, each secondary class can be stored in database 246 in association with a plurality of items of secondary response data, and application server 116 can be configured to select one of the items, for example at random. Additional mechanisms for selecting secondary response data will be described in further detail below.

At block 330, application server 116 is configured to generate a response message by combining the primary and secondary response data selected at blocks 320 and 325, respectively. More specifically, in the present embodiment application server 116 is configured to append the secondary response data to the primary response data, resulting, for example, in the response message "Winter is my favourite season! :)". Following generation of the response message, application server 116 is configured to transmit the response message to the originating client device (in this case, client device 104*a*) via network 108.

Thus, through the performance of method 300, application server 116 is configured to receive a message from a client device 104, and to respond to that message autonomously, automatically identifying and responding to two independent aspects of the received message.

Figure 4:
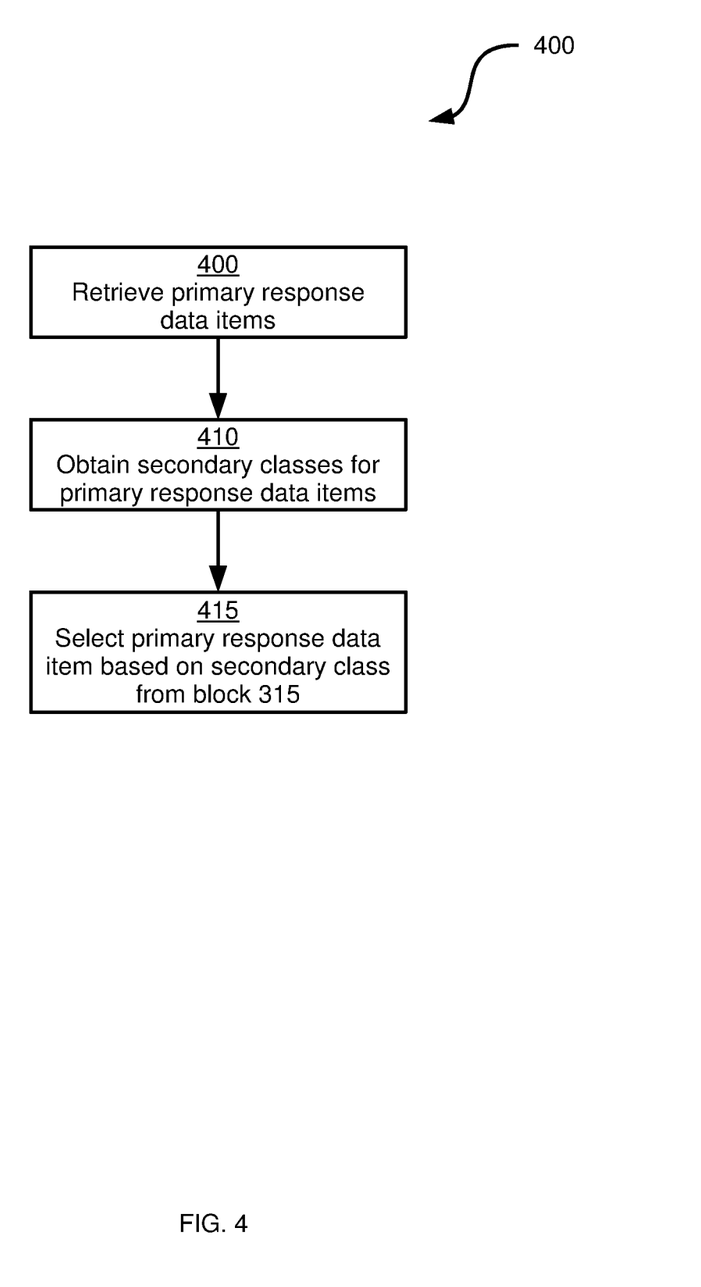
FIG. 4 depicts a method of selecting secondary response data, according to a non-limiting embodiment.

Variations to the above are contemplated. In particular, various mechanisms are contemplated for performing block 325 of method 300. Turning to FIG. 4, a method 400 of selecting secondary response data at block 325 is illustrated. In the performance of method 400, it is assumed that application server 116 is configured to select a plurality of primary response data items at block 320, rather than a single response data item. That is, rather than select only one response data item, for example at random from the available plurality of response data items for the selected primary class (as discussed earlier), application server 116 is configured to select at least two, and up to all available response data items for the selected primary class. At block 400, application server 116 is configured to retrieve the plurality of selected primary response data items from block 320.

At block 405, application server 116 is configured to obtain secondary classifications for each of the primary response data items retrieved at block 400. As noted earlier, the primary response data can be a message string (or a plurality of message strings), and thus at block 410 application server 116 can be configured to classify each of the primary response message strings using the same process as referred to above at block 315. In other embodiments, the primary response data items can be pre-classified, and database 246 can contain a pre-computed secondary class identifier in connection with each primary response data item.

At block 415, application server 116 is configured to select one of the primary response data items based on the secondary classes of the primary response data items and the secondary class of the received message (as determined at block 315). Application server 116 may, for example, select a primary response data item having the same secondary class as the received message.

Figure 5:
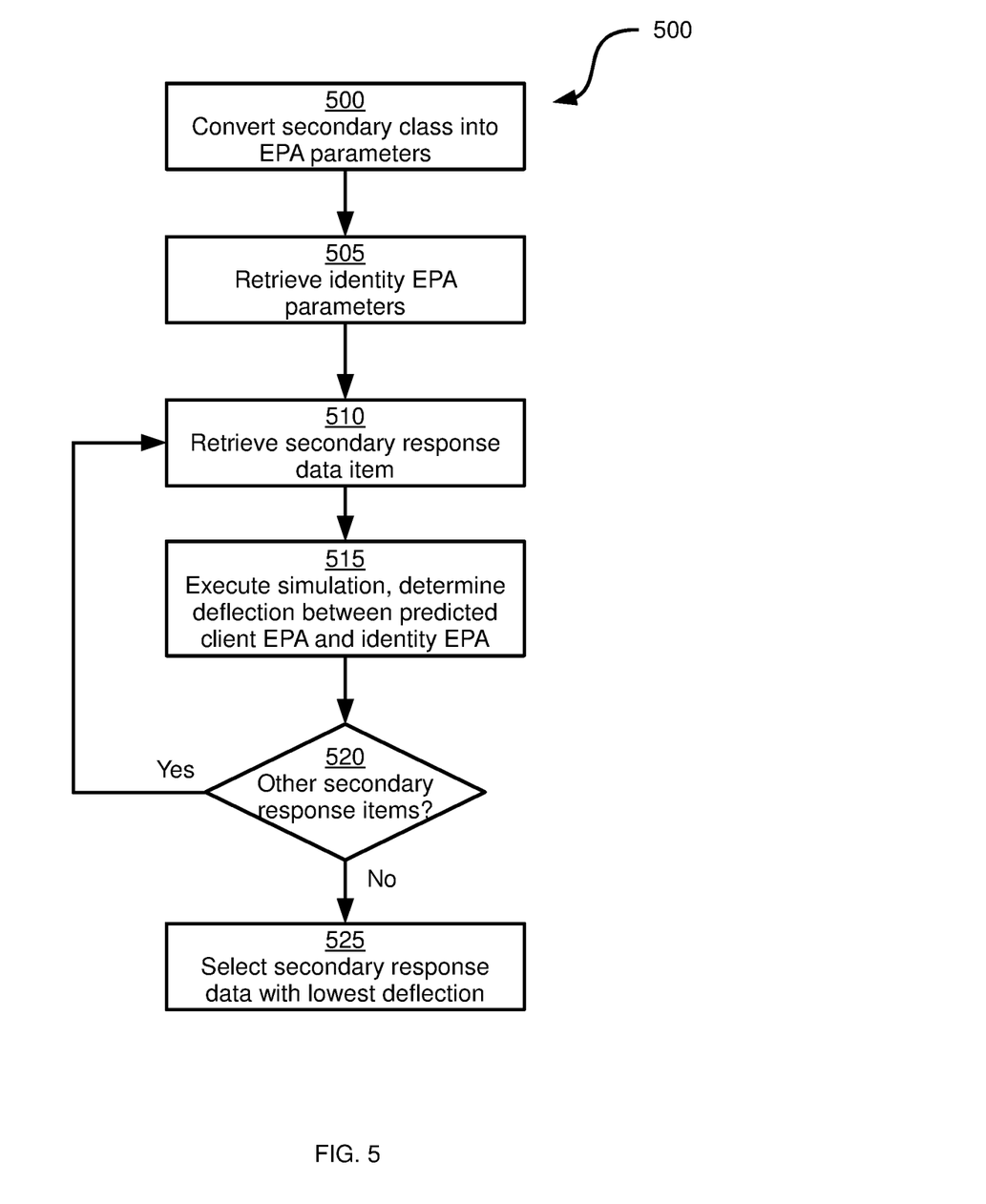
FIG. 5 depicts a method of selecting secondary response data, according to another non-limiting embodiment.

Turning now to FIG. 5, a more complex mechanism for the selection of secondary response data at block 325 is depicted in the form of a method 500. The performance of method 500 represents an implementation of the social interaction model referred to by those skilled in the art as Bayesian Affect Control Theory (BayesACT). See, for example: Jesse Hoey, Tobias Schroeder and Areej Alhothali, Bayesian Affect Control Theory, *Proc. of the Humane Association Conference on Affective Computing and Intelligent Interaction* (*ACII*), Geneva, Switzerland, 2013, pp. 166-172.

At block 500, application server 116 is configured to convert the secondary class selected at block 315 to a set of parameters referred to as an Evaluation, Potency, Activity (EPA) vector (or simply EPA parameters). Application server 116 may, for example, store in database 246 a corresponding EPA vector for each secondary class definition.

At block 505, application server 116 is configured to retrieve preconfigured identity EPA parameters assigned to application server 116 itself. The preconfigured identity parameters reflect the assignment of a certain identity to application server 116 that guides how application server 116 responds to incoming messages received at block 305, as will be seen below.

At block 510, application server 116 is configured to retrieve an item of secondary response data. In this embodiment, secondary response data items are not stored in correspondence with secondary class definitions. Instead, secondary response data items are independent of secondary classes. Examples of secondary classes and secondary response data items are shown below in Tables 1 and 2, respectively.

TABLE 1

Example Secondary Classes
Secondary Class

Neutral
Angry
Disgusted
Scared
Happy
Sad
Surprised

TABLE 2

Example Secondary Response Data
Secondary Response (Emoticon ID)

| | |
|---|---|
| neutral | humiliated |
| accommodating | joyful |
| amused | joyless |
| angry | mad |
| apologize | pleased |
| contemptuous | proud |
| contented | relaxed |
| disgusted | relieved |
| embarrassed | sad |
| enthusiastic | satisfied |
| excited | scared |

TABLE 2-continued

Example Secondary Response Data
Secondary Response (Emoticon ID)

| | |
|---|---|
| fearful | shocked |
| gentle | sorry |
| glad | surprised |
| happy | sympathetic |

Each item of secondary response data also has an associated EPA vector. Having retrieved an item (e.g. the first item in Table 2) of secondary response data, at block 515 application server 116 is configured to execute a simulation (as prescribed by the BayesACT model) to determine the deflection—that is, the distance—between the preconfigured identity EPA and a predicted EPA of a client response. In other words, the retrieved item of secondary response data is processed by application server 116 as a hypothetical response to the message received at block 305, and the simulation generates a prediction as to the EPA parameters of the next message received from client device 104*a*, in response to that action.

At block 520, application server 116 is configured to repeat the performance of blocks 510 and 515 for each remaining item of secondary response data. When every item of secondary response data has been processed, application server 116 is configured, at block 525, to select the item of secondary response data corresponding to the lowest deflection predicted at block 515. In other words, application server 116 is configured to select secondary response data with the predicted effect of altering the EPA parameters of future messages from client device 104*a* such that those EPA parameters are closer (e.g. in terms of Euclidian distance) to the preconfigured EPA parameters at application server 116.

Other implementations of BayesACT may also be performed by application server 116. Certain such implementations will now be apparent to those skilled in the art, based on the discussions above.

Additional variations to the systems and methods herein are also contemplated. For example, the secondary classes need not relate to emotional states. In other embodiments, the secondary classes can define other aspects of the messages received by application server 116, such as predicted characteristics of an operator of client device 104*a* (e.g. age, gender, nationality and the like).

Those skilled in the art will appreciate that in some embodiments, the functionality of one or both of processors 200 and 234 (along with applications 208 and 238, respectively) may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

We claim:

1. A method in an application server, comprising:
    storing a plurality of primary class definitions in a memory, each primary class definition including a primary class identifier and a plurality of primary class attributes;
    storing a plurality of secondary class definitions in the memory, each secondary class definition including a secondary class identifier and a plurality of secondary class attributes;
    storing a plurality of secondary response data items in the memory;
    receiving a message from a client computing device via a network;
    based on the content of the message, selecting one of the primary class identifiers, and one of the secondary class identifiers;
    selecting primary response data corresponding to the selected primary class identifier;
    converting the selected secondary class identifier into a vector;
    for each secondary response data item:
        (i) executing a simulation based on the vector, a predefined identity vector, and the secondary response data item, to generate a predicted client device vector;
        (ii) determining a distance between the predefined identity vector and the predicted client device vector; and
        (iii) selecting, as secondary response data corresponding to the selected secondary class identifier, the secondary response data item having the lowest distance;
    generating a response message by combining the primary response data and the secondary response data; and
    transmitting the response message to the client computing device.

2. The method of claim 1, wherein generating the response message comprises appending the secondary response data to the primary response data.

3. The method of claim 1, wherein the primary response data comprises a text string, and the second response data comprises at least one of an emoticon and an image file.

4. The method of claim 1, further comprising:
    storing a primary response data item in the memory in association with each of the primary class identifiers.

5. The method of claim 4, further comprising:
    storing a plurality of primary response data items in the memory in association with each of the primary class identifiers;
    selecting the primary response data by:
    retrieving the plurality of primary response data items stored in association with the selected primary class identifier
    for each of the retrieved primary response data items, obtaining a secondary class identifier;
    selecting one of the retrieved plurality of primary response data items having a secondary class identifier corresponding to the selected secondary class identifier.

6. The method of claim 5, wherein obtaining the secondary class identifier comprises:
    storing, in association with each of the plurality of primary response data items, a pre-computed secondary class identifier; and
    retrieving the pre-computed secondary class identifier.

7. The method of claim 5, wherein obtaining the secondary class identifier comprises:
    deriving a plurality of attributes from each of the plurality of primary response data items; and
    selecting the secondary class identifier based on a comparison between the plurality of attributes and the secondary class attributes.

8. The method of claim 1, further comprising:
    storing a plurality of secondary response data items in the memory, each secondary response data item corresponding to one of the secondary class identifiers;

wherein selecting the secondary response data comprises selecting one of the plurality of items of secondary response data corresponding to the selected secondary class identifier.

9. An application server, comprising:
a communications interface;
a memory storing (i) a plurality of primary class definitions in a memory, each primary class definition including a primary class identifier and a plurality of primary class attributes, (ii) a plurality of secondary class definitions in a memory, each secondary class definition including a secondary class identifier and a plurality of secondary class attributes, and (iii) a plurality of secondary response data items in the memory;
a processor interconnected with the communications interface and the memory, the processor configured to:
receive a message from a client computing device via the communications interface;
based on the content of the message, select one of the primary class identifiers, and one of the secondary class identifiers;
select primary response data corresponding to the selected primary class identifier;
convert the selected secondary class identifier into a vector;
for each secondary response data item:
(a) execute a simulation based on the vector, a predefined identity vector, and the secondary response data item, to generate a predicted client device vector;
(b) determine a distance between the predefined identity vector and the predicted client device vector; and
(c) select, as secondary response data corresponding to the selected secondary class identifier, the secondary response data item having the lowest distance;
generate a response message by combining the primary response data and the secondary response data; and
transmit the response message to the client computing device via the communications interface.

10. The application server of claim 9, wherein generating the response message comprises appending the secondary response data to the primary response data.

11. The application server of claim 9, wherein the primary response data comprises a text string, and the second response data comprises at least one of an emoticon and an image file.

12. The application server of claim 9, the memory storing a primary response data item in association with each of the primary class identifiers.

13. The application server of claim 12, the memory storing a plurality of primary response data items in association with each of the primary class identifiers; the processor further configured to select the primary response data by:
retrieving the plurality of primary response data items stored in association with the selected primary class identifier
for each of the retrieved primary response data items, obtaining a secondary class identifier;
selecting one of the retrieved plurality of primary response data items having a secondary class identifier corresponding to the selected secondary class identifier.

14. The application server of claim 13, the processor further configured to obtain the secondary class identifier by:
storing, in association with each of the plurality of primary response data items, a pre-computed secondary class identifier; and
retrieving the pre-computed secondary class identifier.

15. The application server of claim 13, the processor further configured to obtain the secondary class identifier by:
deriving a plurality of attributes from each of the plurality of primary response data items; and
selecting the secondary class identifier based on a comparison between the plurality of attributes and the secondary class attributes.

16. The application server of claim 9, the memory storing a plurality of secondary response data items, each secondary response data item corresponding to one of the secondary class identifiers;
the processor further configured to select the secondary response data by:
selecting one of the plurality of items of secondary response data corresponding to the selected secondary class identifier.

* * * * *